US011233870B1

(12) United States Patent
Gupta et al.

(10) Patent No.: US 11,233,870 B1
(45) Date of Patent: Jan. 25, 2022

(54) METHOD AND APPARATUS FOR SIMPLIFYING EXTENSION MOBILITY LOGIN INTO CALL CONTROL SERVER USING HEADSET CONNECTED TO IP PHONE

(71) Applicant: Cisco Technology, Inc., San Jose, CA (US)

(72) Inventors: Ajay Kumar Gupta, Morrisville, NC (US); Basant Kumar Basavaraj, Richardson, TX (US); Alberto J. Montilla Bravo, Allen, TX (US); Padmini Krishnan, Murphy, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/792,578

(22) Filed: Feb. 17, 2020

(51) Int. Cl.
  *G06F 15/16* (2006.01)
  *G06F 9/54* (2006.01)
  *H04L 29/08* (2006.01)
  *H04M 1/60* (2006.01)
  *H04L 29/06* (2006.01)

(52) U.S. Cl.
  CPC .......... *H04L 67/303* (2013.01); *H04L 63/083* (2013.01); *H04L 63/102* (2013.01); *H04L 67/34* (2013.01); *H04M 1/6066* (2013.01)

(58) Field of Classification Search
  CPC ...................................................... H04L 67/34
  USPC ........................................................ 709/223
  See application file for complete search history.

(56) References Cited

U.S. PATENT DOCUMENTS

| 7,567,552 | B2  | 7/2009  | Lee et al. |
| 7,945,036 | B1  | 5/2011  | Tonogai et al. |
| 7,958,276 | B2* | 6/2011  | Storey .................. G06F 9/4411 710/8 |
| 8,144,692 | B2  | 3/2012  | Haddad et al. |
| 8,315,876 | B2  | 11/2012 | Reuss |
| 8,732,279 | B2  | 5/2014  | Nedeltchev et al. |
| 8,819,188 | B2  | 8/2014  | Blatherwick et al. |
| 9,065,684 | B2  | 6/2015  | Tanizawa et al. |

(Continued)

OTHER PUBLICATIONS

Cisco, "Connecting Your Phone", 6 pages. retrieved from Internet Nov. 12, 2019; https://www.cisco.com/en/US/docs/voice_ip_comm/cuipph/7920/5_0/english/user/guide/7920con.html.

*Primary Examiner* — Hamza N Algibhah
(74) *Attorney, Agent, or Firm* — Edell, Shapiro & Finnan, LLC

(57) ABSTRACT

A call control entity ("entity") communicates with Internet Protocol (IP) phones. Upon receiving from an IP phone a headset connect message indicating that a headset is connected to the IP phone and including a headset identifier of the headset, the entity determines whether there is stored in a call control database a mapping between the headset identifier and a user identifier associated with a user, the mapping configured to provide access to an existing IP phone configuration profile in the call control database. If the mapping exist, the entity completes an extension mobility auto login of the user through the IP phone, which results in acquiring the user identifier from the IP phone. Responsive to completing the extension mobility auto login, the entity accesses the existing IP phone configuration profile based on the user identifier and the mapping, and configures the IP phone with the existing IP phone configuration profile.

20 Claims, 11 Drawing Sheets

(56) References Cited

U.S. PATENT DOCUMENTS

| | | | |
|---|---|---|---|
| 9,094,822 B2 * | 7/2015 | Kurupacheril | H04M 1/2471 |
| 9,160,863 B2 | 10/2015 | Morrison et al. | |
| 9,172,799 B2 * | 10/2015 | Toebes | H04M 3/42374 |
| 9,216,355 B2 * | 12/2015 | Wolff-Petersen | A63F 13/85 |
| 9,277,320 B1 * | 3/2016 | Hoskins | H04R 1/1041 |
| 9,549,259 B2 | 1/2017 | Reuss | |
| 9,717,106 B2 * | 7/2017 | Bell et al. | |
| 9,973,591 B2 * | 5/2018 | Tan | H04L 63/08 |
| 2002/0115479 A1 * | 8/2002 | Tischler | H04M 1/737 |
| | | | 455/575.5 |
| 2002/0131402 A1 * | 9/2002 | Lee | H04L 61/10 |
| | | | 370/352 |
| 2009/0081999 A1 * | 3/2009 | Khasawneh | H04M 3/56 |
| | | | 455/416 |
| 2009/0325491 A1 * | 12/2009 | Bell | H04L 12/66 |
| | | | 455/41.3 |
| 2015/0106475 A1 * | 4/2015 | Tan | H04S 5/005 |
| | | | 709/217 |
| 2018/0063310 A1 * | 3/2018 | McGary | H04W 12/06 |
| 2019/0020952 A1 * | 1/2019 | Moova | G06F 3/167 |
| 2019/0082477 A1 * | 3/2019 | Burton | H04W 76/11 |
| 2019/0289653 A1 * | 9/2019 | Sarkar | H04M 3/56 |
| 2020/0360208 A1 * | 11/2020 | Burton | A61G 7/05 |

\* cited by examiner

550

552

UPON RECEIVING FROM A FIRST IP PHONE A FIRST HEADSET CONNECT MESSAGE INDICATING THAT A HEADSET IS CONNECTED TO THE FIRST IP PHONE AND INCLUDING A HEADSET IDENTIFIER OF THE HEADSET, WHEN IT IS DETERMINED THAT A USER IDENTIFIER-TO-HEADSET IDENTIFIER MAPPING BY WHICH AN EXISTING IP PHONE CONFIGURATION PROFILE IS ACCESSIBLE DOES NOT EXIST, ONBOARDING THE HEADSET TO CREATE THE MAPPING

554

UPON RECEIVING FROM A SECOND IP PHONE A SECOND HEADSET CONNECT MESSAGE INDICATING THAT THE HEADSET IS CONNECTED TO THE SECOND IP PHONE AND INCLUDING THE HEADSET IDENTIFIER, DETERMINE THAT THE MAPPING EXISTS, COMPLETE AN EXTENSION MOBILITY AUTO LOGIN THROUGH THE SECOND IP PHONE, ACCESS THE EXISTING IP PHONE CONFIGURATION PROFILE BASED ON RESULTS OF THE LOGIN AND THE MAPPING, AND CONFIGURE THE SECOND IP PHONE WITH THE EXISTING IP PHONE CONFIGURATION PROFILE

FIG.5B

METHOD AND APPARATUS FOR SIMPLIFYING EXTENSION MOBILITY LOGIN INTO CALL CONTROL SERVER USING HEADSET CONNECTED TO IP PHONE

TECHNICAL FIELD

The present disclosure relates to Internet Protocol (IP) phone extension mobility.

BACKGROUND

An Internet Protocol (IP) phone, also referred to as a voice-over-IP (VoIP) phone, communicates with other IP phones over the Internet via an exchange of IP packets with the other IP phones. A user may configure an IP phone with various configuration settings, e.g., with a user specific configuration profile, tailored to needs and preferences of the user. Also, a user may use several different IP phones at different times depending on his or her geographical location and IP phone availability. Preferably, each of the different IP phones implements the same user specific configuration profile for the user. Also, IP phone extension mobility permits the user to use the different IP phones by logging into a call control server through each of the IP phones. Conventionally, manual interactions between the user and an input/output (I/O) interface of an IP phone are used to achieve the login. The manual interactions typically include user navigation through soft-key options and soft-menus on the I/O interface in order to enter at least a user identifier and a user personal identification number (PIN) including alphanumeric characters. This can be challenging because of limitations of the I/O interface, and the fact that different IP phones provide different I/O interfaces, soft-key options, and soft-menus.

BRIEF DESCRIPTION OF THE DRAWINGS

FIG. 5B is a flowchart of a method of performing headset onboarding and extension mobility auto login through first and second IP phones, respectively, using a headset, according to an example embodiment.

DESCRIPTION OF EXAMPLE EMBODIMENTS

Overview

Figure 1:
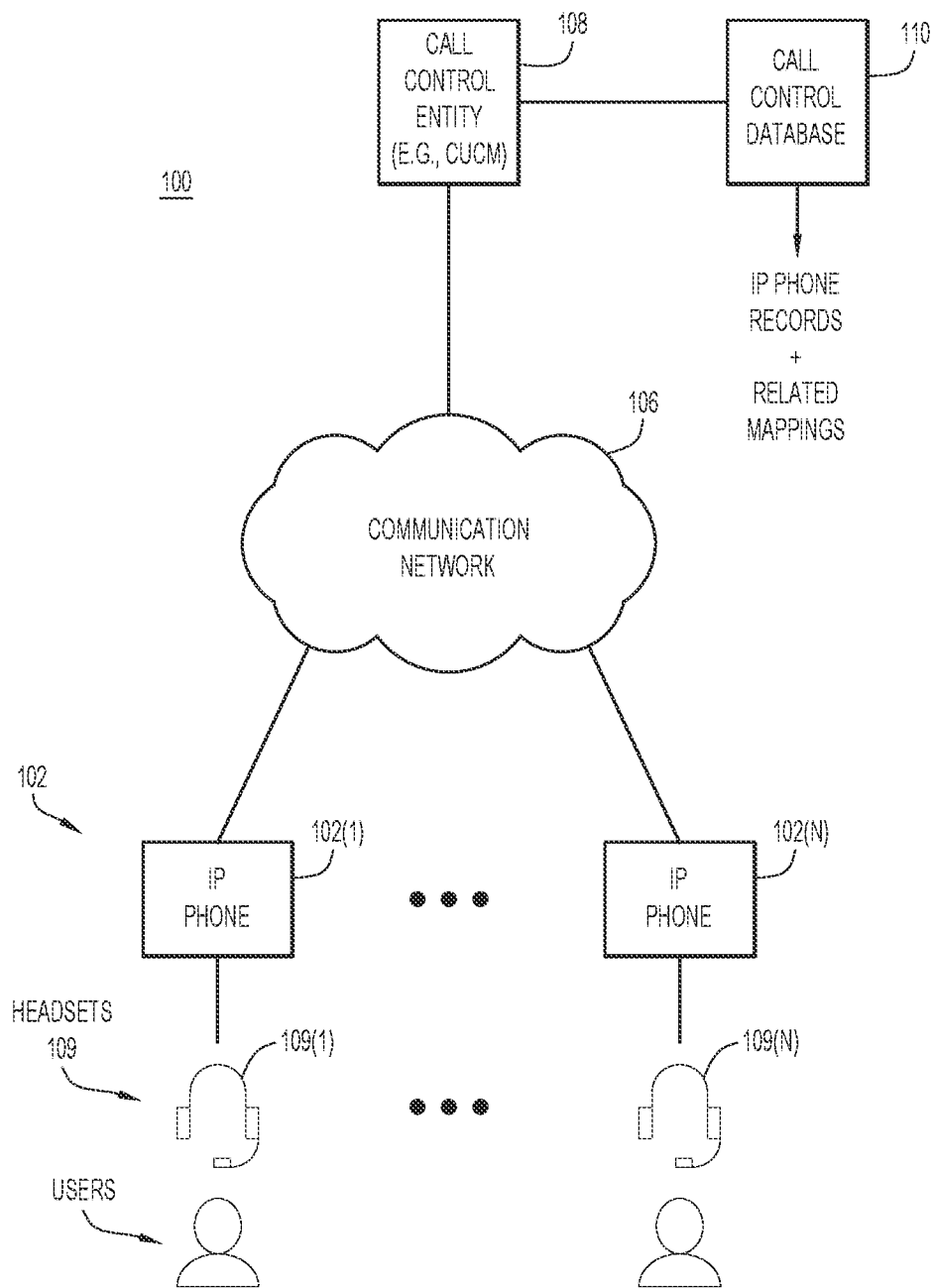
FIG. 1 is a block diagram of a network environment in which embodiments directed to simplifying extension mobility auto login of a user into a call control entity, using a headset connected to an IP phone, may be implemented, according to an example embodiment.

A method is performed by a call control entity configured to communicate with Internet Protocol (IP) phones. The method includes, upon receiving from an IP phone a headset connect message indicating that a headset is connected to the IP phone and including a headset identifier of the headset, determining whether there is stored in a call control database a mapping between the headset identifier and a user identifier associated with a user, wherein the mapping is configured to provide access to an existing IP phone configuration profile in the call control database. The method further includes, if the mapping exist, completing an extension mobility auto login of the user through the IP phone, which results in acquiring the user identifier from the IP phone. The method also includes, responsive to the completing the extension mobility auto login, accessing the existing IP phone configuration profile based on the user identifier and the mapping, and configuring the IP phone with the existing IP phone configuration profile.

Another method includes, upon receiving from a first IP phone a first headset connect message indicating that a headset is connected to the first IP phone and including a headset identifier of the headset, onboarding the headset by acquiring a user identifier assigned to a user from the first IP phone, and creating a mapping between the user identifier and the headset identifier and by which an existing IP phone configuration profile is accessible. The method further includes, upon receiving from a second IP phone a second headset connect message indicating that the headset is connected to the second IP phone and including the headset identifier of the headset, completing an extension mobility auto login of the user through the second IP phone, which results in acquiring the user identifier from the second IP phone. The method also includes, responsive to the completing the extension mobility auto login, accessing the existing IP phone configuration profile based on the user identifier and the mapping, and configuring the IP phone with the existing IP phone configuration profile.

Example Embodiments

Headsets are used with IP phones, ubiquitously, in open space work environments, where users can easily migrate between different available siting spaces equipped with different IP phones, and login to the IP phones using an extension mobility login process. Extension mobility login is an IP telephony feature that enables a user to login to any IP phone, conventionally, by entering user credentials into the IP phone. Embodiments presented herein use a headset of a user as a user identity to simplify extension mobility login across the different IP phones, instead of entering an alphanumeric user identifier and PIN into the IP phones themselves. At a high-level, the embodiments create an association or mapping between the user and his/her headset at a call control server, and use the association to simplify subsequent extension mobility login, referred to in the embodiments presented below as "extension mobility auto login." Upon completing extension mobility auto login at the IP phone or any other IP phone, that IP phone downloads an IP phone configuration profile, e.g., extension number, dial plan, speed dials, and so on, associated with the user, and configures itself with the profile.

With reference to FIG. 1, there is block diagram of a network environment in which embodiments directed to simplifying extension mobility auto login into a call control entity, using a headset connected to an IP phone, may be implemented. Network environment 100 includes Internet Protocol (IP) phones (also referred to as voice-over-IP (VoIP phones) 102(1)-102(N) (collectively, "IP phones 102") associated with and operated by respective users. IP phones 102 may include desk phones and mobile phones. IP phones 102 are configured to connect with and communicate over a communication network 106, which may include one or more wide area networks (WANs), such as the Internet, and one or more local area networks (LANs), for example. Network environment 100 also includes a call control entity 108 (also referred to as a "call manager 108" or a "call control server 108") configured to connect to communication network 106 and communicate with IP phones 102 over the communication network. Call control entity 108 includes one or more call control servers that host applications to collectively implement a communication infrastructure to host services that provide provisioning/registering of IP phones 102, call control methods, and session management methods for the IP phones, once the IP phones have been provisioned/registered on the call control entity. In an example, call control entity 108 may include one or more components of a Cisco Uniform Communication Manager (CUCM) configured to implement the embodiments presented herein.

IP phones 102(1)-102(N) may be configured to connect directly to corresponding ones of headsets 109(1)-109(N) (collectively referred to as headsets 109) worn by users, although one or more of the IP phones may not include headsets. The connections between corresponding pairs of IP phones 102 and headsets 109 may include wired connections and/or wireless/radio connections (e.g., Bluetooth connections). A given headset 109(i) typically includes a microphone and speakers to receive and transmit audio, respectively. When IP phone 102(i) is connected to headset 109(i) worn by a user, audio associated with the IP phone, such as call audio, may be routed from the IP phone to the speakers of the headset, and from the microphone of the headset to the IP phone. Accordingly, the user may use headset 109(i) to carry on telephone conversations, listen to voicemails, and so on, at IP phone 102(i).

Each headset 109(i) includes memory to store a headset identifier that may be accessed/retrieved/read from the memory by an IP phone 102(i) connected to the headset. The headset identifier includes any unique value which may be used to differentiate the headset from other headsets, which may include headsets of the same make and/or model. Examples of the headset identifier include a serial number of the headset, a media access control (MAC) address of the headset, a Universal Serial Bus (USB) unique device identifier of the headset, a Bluetooth address of the headset, and so on. To this end, the headset identifier may include any unique software readable device identifier that has been assigned to and configured on the headset and serves the purposes described herein.

Call control entity 108 includes a call control database 110 to store IP phone records and associated headset mappings for various ones of IP phones 102 provisioned on/registered with the call control entity, and for various ones of headsets 109 connected with the IP phones, as described below in connection with FIG. 2A. Provisioning an IP phone on call control entity 108 includes, but is not limited to, creating a corresponding IP phone record for the IP phone in call control database 110.

Figure 2A:
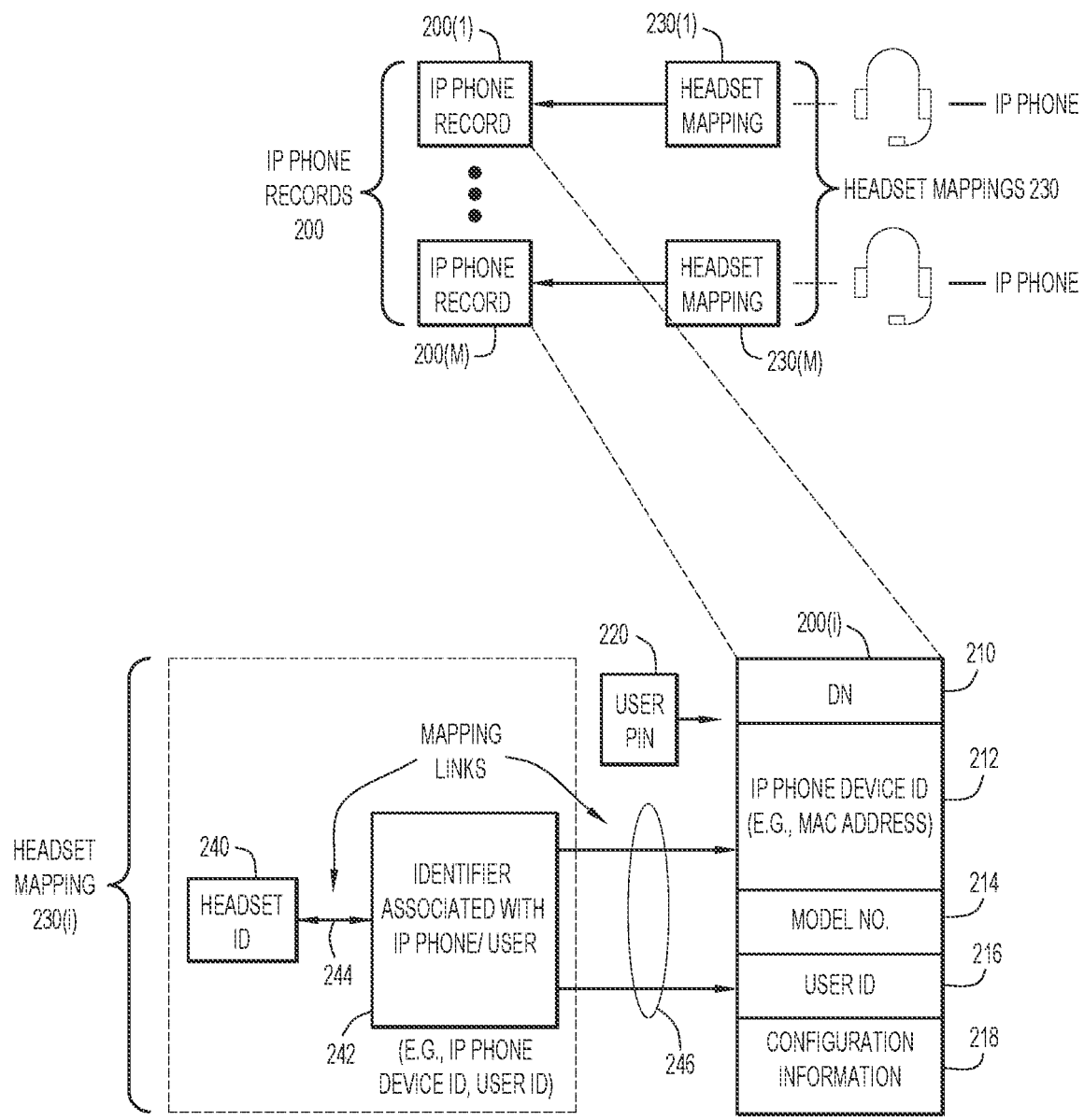
FIG. 2A is an illustration of IP phone records and headset mappings stored in a call control database accessible to the call control entity, according to an example embodiment.

With reference to FIG. 2A, there is an illustration of example IP phone records 200(1)-200(M) (collectively referred to as "IP phone records 200") stored in call control database 110 for corresponding ones of IP phones 102 provisioned on/registered with call control entity 108. Each IP phone record 200(i) corresponds to one of IP phones 102 and is associated with a corresponding user. Each IP phone record 200(i) includes: a directory number (DN) (also referred to as a "phone number") 210 assigned to the user associated with the IP phone record; an IP phone device identifier (ID) 212, such as a media access control (MAC) address of the IP phone corresponding to the IP phone record and that is provisioned on/registered with call control entity 108; a model number 214 of the IP phone; a user identifier 216 of the user; and IP phone configuration information 218 associated with the user and the IP phone and that may be used to configure the IP phone for operation. IP phone record 200(i) is shown by way of example, and the IP phone record may include more or less information. For example, directory number 210 may be omitted from the IP phone record itself, and used instead as an index or pointer to the IP phone record.

For purposes of security controlled access to IP phone record 200(i), call control database 110 may also store, and associate with the IP phone record, a predetermined user PIN 220 that is assigned to the user. In this case, call control entity 108 uses the user PIN to control or condition access to IP phone record 200(i) based on the user PIN, e.g., the call control entity permits access to the IP phone record only when the user PIN 220 has been presented to the call control entity.

Director number 210 assigned to the user is used to make phone calls with the IP phone, as is known. Directory number 210 may be stored in multiple (different) IP phone records corresponding to multiple (different) IP phones, and thus used to make phone calls with each of the multiple IP phones. Access to the multiple IP phone records may be controlled based on the user PIN (e.g., user PIN 220) assigned to the user who is associated with each of the IP phone records. Device identifier 212 is typically unique to the IP phone represented by the IP phone record. The collection of directory number 210, device identifier 212, and user ID 216 in IP phone record 200(i) associates the user, the directory number, and the IP phone to each other.

IP phone configuration information 218 includes IP phone configuration parameters/settings (e.g., an IP phone configuration profile) used to configure the IP phone. IP phone configuration information 218 includes user settings for options such as speed-dialing, call-forwarding, and the like. IP phone configuration information 218 includes administration settings, such as security settings, class-of-service settings, and the like. Thus, in an example, IP phone configuration information 218 includes custom IP phone configuration parameters associated with (and usually defined by) the user and that follow the user from one IP phone to another IP phone used by the user, and standard IP phone configuration parameters that are not specifically associated with the user. Examples of IP phone configuration information 218 include, but are not limited to, one or more of an IP phone button template, an IP phone soft-key template, IP phone default parameters, an IP phone recording profile, a user identifier, an extension number, a dial plan, speed dials, and so on. IP phone configuration information 218, or portions thereof, are also referred to as an IP phone configuration profile.

As mentioned above, call control database 110 also stores headset mappings 230(1)-230(M) (collectively referred to as headset mappings 230) associated with respective ones of IP phone records 200(1)-200(M). Headset mappings 230 are linked to/associated with corresponding ones of IP phone records 200 for corresponding ones of IP phones 102 to which the headsets have been or are connected. Headset mappings 230 provide an index or link to corresponding ones of IP phone records 200, which are thus accessible by way of the corresponding headset mappings.

Figure 3:
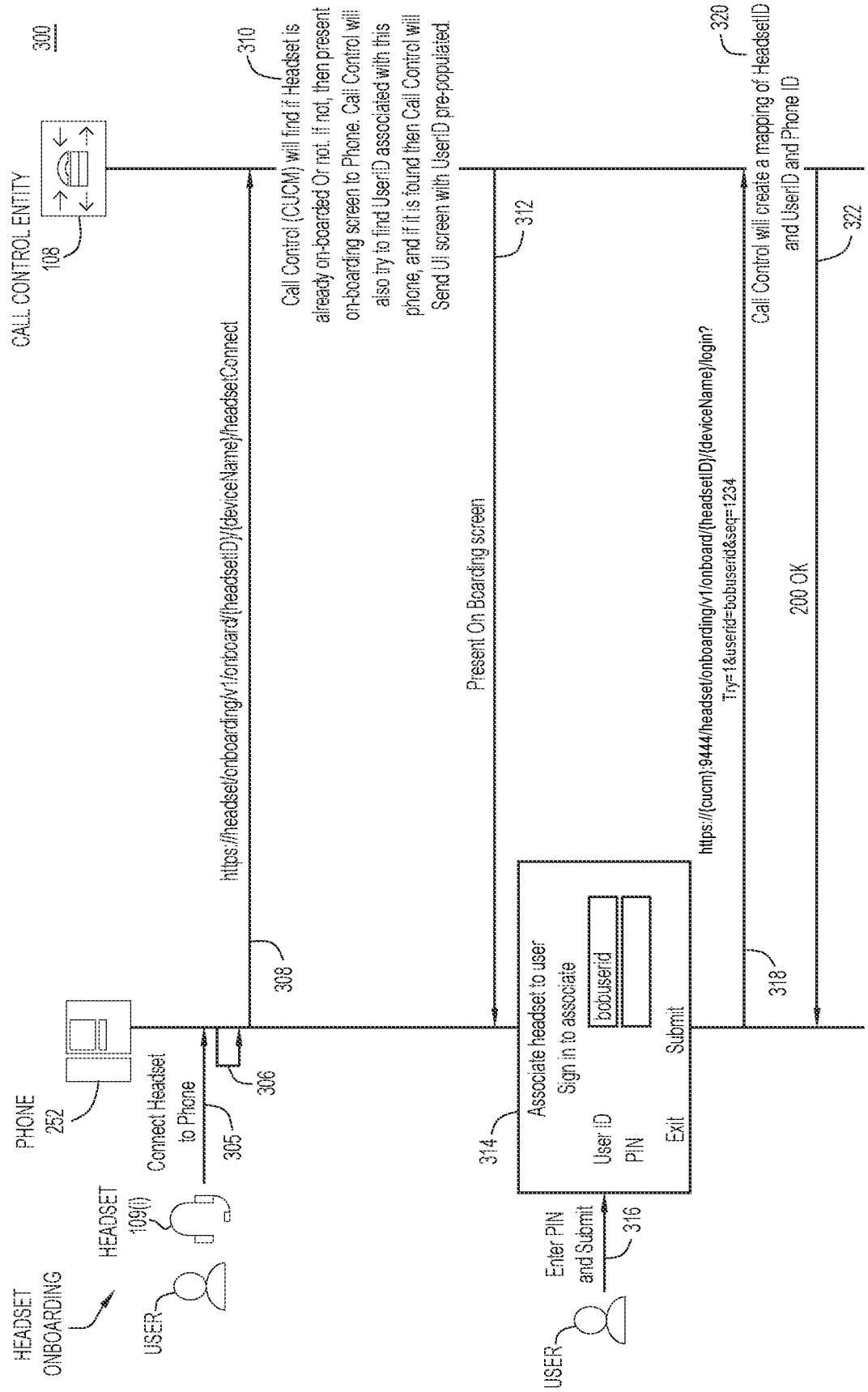
FIG. 3 is a transaction diagram of detailed transactions for headset onboarding performed when a headset is initially connected to an IP phone, according to an example embodiment.

An example headset mapping 230(i) linked to/associated with IP phone record 200(i) is shown at the bottom left-hand corner of FIG. 3. Headset mapping 230(i) includes (i) a headset identifier 240 of a headset that was or is connected to an IP phone identified by device identifier 212 or user identifier 216 of IP phone record 200(i), (ii) at least one identifier 242 associated with the IP phone/user of the IP phone, (iii) an association or link 244 between the headset identifier and the at least one identifier, and (iv) an association or link 246 between the at least one identifier and the IP phone record. At least one identifier 242 may include device identifier 212 of the IP phone to which the headset was or is connected, user identifier 216 of the user to which the IP phone (and the IP phone record) is assigned, or both the device identifier of the IP phone and the user identifier. At least one identifier 242 may be replaced by at least one link to the corresponding identifier in IP phone record 200(i). Thus, headset mapping 230(i) maps headset identifier 240 to IP phone record 200(i) via at least one identifier 242 (e.g., the device identifier of the IP phone and/or the user identifier). In other examples, the headset mappings may be mapped or linked to respective IP phone configurations/profiles that are created and stored independent of any particular IP phone record, and are accessible based on a user identifier used in the mapping. According to embodiments presented herein, the headset mappings may be created at least in part by a headset onboarding process described below.

Embodiments for simplifying extension mobility auto login using a headset connected to an IP phone are described below in connection with FIGS. 2B, 3, 4A, 4B, 5A, and 5B. In the ensuing description and in the figures, "IP phone" may be replaced with simply "phone."

Figure 2B:
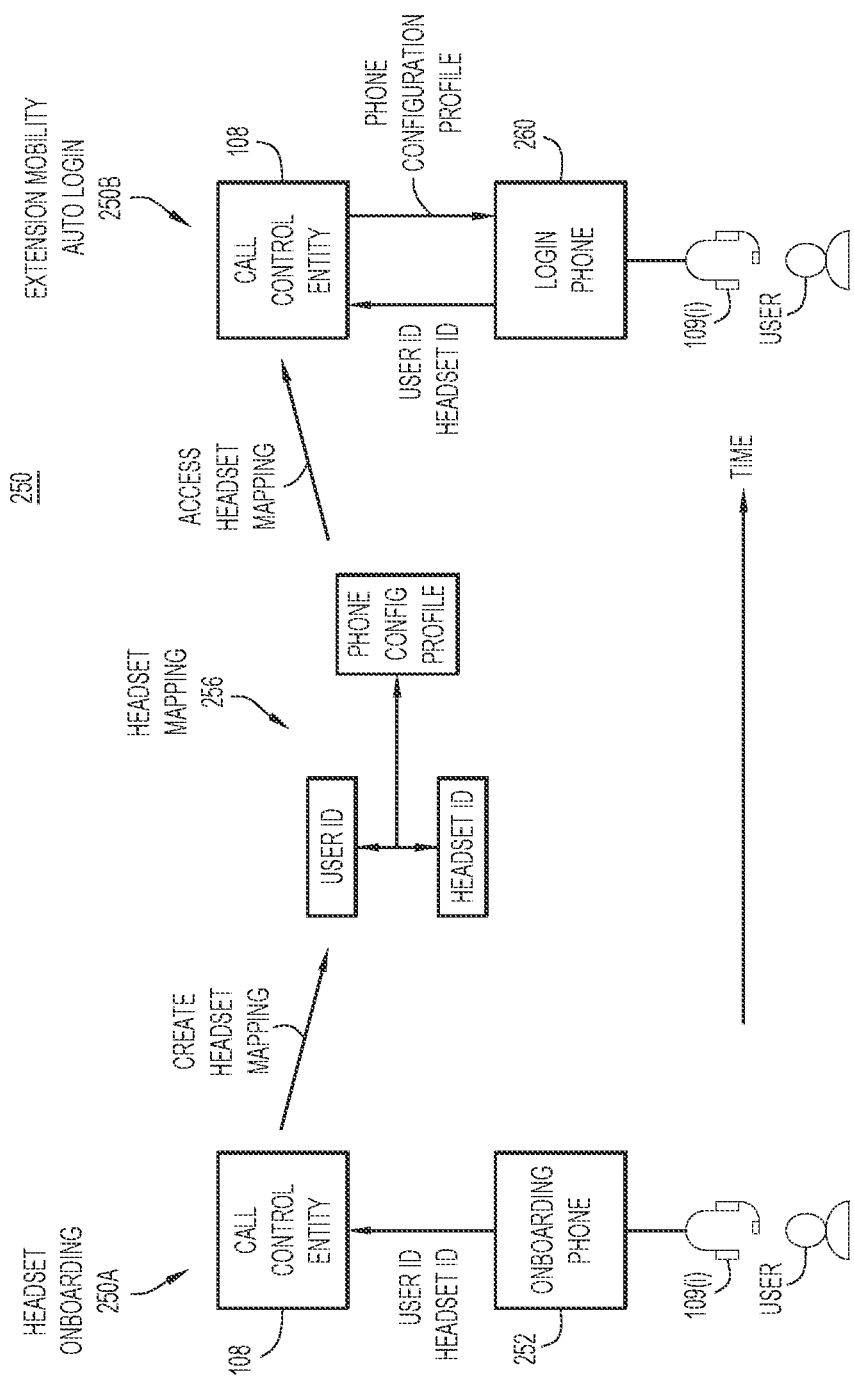
FIG. 2B is an illustration of a high-level method of headset onboarding and extension mobility auto login using a headset connected to one or more IP phones, according to an example embodiment.

With reference to FIG. 2B, there is an illustration of an example high-level method 250 of headset onboarding 250A (shown on the left-hand side of FIG. 2B), and extension mobility auto login 250B (shown on the right-hand side of FIG. 2B). Headset onboarding 250A is performed first, and then extension mobility auto login is performed.

Referring to the left-hand side of FIG. 2B, initially, a user connects headset 109(i) to phone 252, e.g., one of phones 102 referred to as an "onboarding" phone. Connecting headset 109(i) triggers headset onboarding 250A (also referred to simply as "onboarding"). At a high-level, headset onboarding 250A is a one-time activity by which call control entity 108 (i) receives from phone 252 a headset identifier of headset 109(i) and a user identifier assigned to a user, (ii) creates a headset mapping 256 of the user identifier to the headset identifier, and (iii) stores the headset mapping in call control database 110 for subsequent access by call control entity 108 based on the headset user identifier. The user identifier may also be mapped to, or otherwise make accessible to call control entity 108, an IP phone configuration profile associated with/assigned to the user. That is, headset mapping 256 may map the user identifier, the headset identifier, and the IP phone configuration profile to each other. In an example, the IP phone configuration profile may include IP phone configuration information 218 of an existing IP phone record 200(i). Alternatively, the IP phone configuration profile may be stored independent of any particular IP phone record. Headset onboarding 250A is described in further detail below in connection with FIG. 3.

Referring to the right-hand side of FIG. 2B, after headset onboarding 250A, the user may disconnect headset 109(i) from phone 252. At later time, the user connects headset 109(i) to phone 260, e.g., one of phones 102 referred to as a "login" phone. Phone 260 may be the same as or different from phone 252. Connecting headset 109(i) to phone 260 triggers extension mobility auto login 250B. At a high-level, extension mobility auto login 250B results in an exchange of messages between phone 260, call control entity 108, and the user, by which the call control entity acquires the user identifier from the user. Then, call control entity 108 accesses the IP phone configuration profile stored in call control database 110 using the user identifier and headset mapping 256. Call control entity 108 sends the IP phone configuration profile to phone 260, which receives the profile and configures itself based on the profile. Extension mobility auto login 250B is described in further detail below in connection with FIG. 4A.

With reference to FIG. 3, there is a transaction diagram of example detailed transactions 300 used for headset onboarding of a headset 109(i) performed when the headset is initially connected to a phone 252. Transactions 300 expand on headset onboarding 250A described above. Phone 252 may already be provisioned on/registered with call control entity 108 (e.g., the CUCM). As described above, the headset onboarding creates in call control database 110 headset mapping (e.g., headset mapping 256) between the headset identifier of headset 109(i) and the user identifier assigned to the user (e.g., a "headset ID-user ID" mapping). The user identifier may also be mapped to, or otherwise make accessible to call control entity 108, an IP phone configuration profile associated with/assigned to the user, as also described above. The headset onboarding may also create a mapping between the headset identifier and the device identifier of phone 252 (e.g., a "headset ID-device ID" mapping), if the latter mapping does not already exist. The latter mapping may have been created when phone 252 was initially configured by call control entity 108, prior to when the headset onboarding is performed. Subsequent to the headset onboarding of headset 109(i) through phone 252, extension mobility auto login into call control entity 108 through any phone may be performed using headset 109(i) when the headset is connected to the phone, as described below in connection with FIG. 4A.

At 305, the user connects headset 109(i) to phone 252. The connection enables bi-directional communication between headset 109(i) and phone 252. Sensing the connection, at 306, phone 252 initiates the headset onboarding process locally and, in response, retrieves from headset 109(i) information, including the headset identifier and a device name of the headset. At 308, phone 252 sends to call control entity 108 a headset connect message that may include a request to initiate headset onboarding (i.e., sends a headset onboarding request to the call control entity to have the call control entity onboard headset 109(i)). The request includes the headset identifier, a headset device name, an indicator that the headset is connected to a phone, a device identifier of phone 252, and an indication that the request is to initiate headset onboarding. In an example, the request may be in the form of a HyperText Transfer Protocol (HTTP) request that includes a uniform resource locator (URL) to a headset onboarding service hosted on call control entity 108. Call control entity 108 receives the request.

Responsive to the request, call control entity 108 initiates headset onboarding of headset 109(*i*). Specifically, at 310, call control entity 108 determines whether headset 109(*i*) has already been onboarded, e.g., whether the headset identifier has already been mapped to a user identifier (which may in-turn be mapped to or indicate an IP phone configuration profile in call control database 110). To do this, call control entity searches call control database 110 for an existing headset mapping between the headset identifier and a user identifier. If headset 109(*i*) has already been onboarded, e.g., the headset mapping exists, the onboarding process ends, and flow may proceed to an extension mobility login process described below in connection with FIG. 4A.

On the other hand, if headset 109(*i*) has not been onboarded, e.g., no headset mapping exists between the headset identifier and a user identifier, call control entity 108 continues with the onboarding process. At 312, call control entity sends to phone 252 a headset onboarding user interface (UI) to be displayed on a screen of the phone. For example, call control entity 108 may send to phone 252 a configuration file that includes the UI. The UI includes a prompt to enter a user identifier assigned to a user and, optionally, a prompt to enter a user PIN associated with the user identifier. In addition, call control entity 108 may search call control database 110 for the user identifier in association with the device identifier from the headset connect message and, if found, prepopulate the prompt for the user identifier with the found user identifier. Phone 252 receives the UI from call control entity 108.

Responsive to the headset onboarding UI from call control entity 108, at 314, phone 252 presents the UI on the screen of the phone. The UI includes the prompt for the user identifier and, optionally, the prompt for the user PIN. At 316, the user enters into phone 252 the user identifier and, optionally, the user PIN, if requested. Responsive to entry of the information, at 318, phone 252 sends to call control entity 108 a request to complete the onboarding process. The request includes the headset identifier, the device name, the user identifier, and an indication that the request is for headset onboarding. The request may be in the form of an HTTP request that includes the URL of the onboarding service hosted on call control entity 108. Call control entity 108 receives the request.

Responsive to the request, at 320, call control entity 108 creates a headset mapping between the headset identifier and the user identifier (e.g., headset mapping 256). Call control entity 108 may also create a mapping between the headset identifier and the device identifier of phone 252, if not already present. The mappings link the user identifier to the IP phone configuration profile assigned to the user associated with the user identifier. At 322, call control entity 108 sends to phone 252 a status message indicating success of headset onboarding (e.g., an HTTP 200—OK). New phone 252 receives the status message indicating success.

In summary, the headset onboarding process of FIG. 3 creates in call control database 110 mappings of the headset identifier, the user identifier, and possibly the device identifier (of phone 252) to each other and to the IP phone configuration profile assigned to the user associated with the user identifier.

Figure 4A:
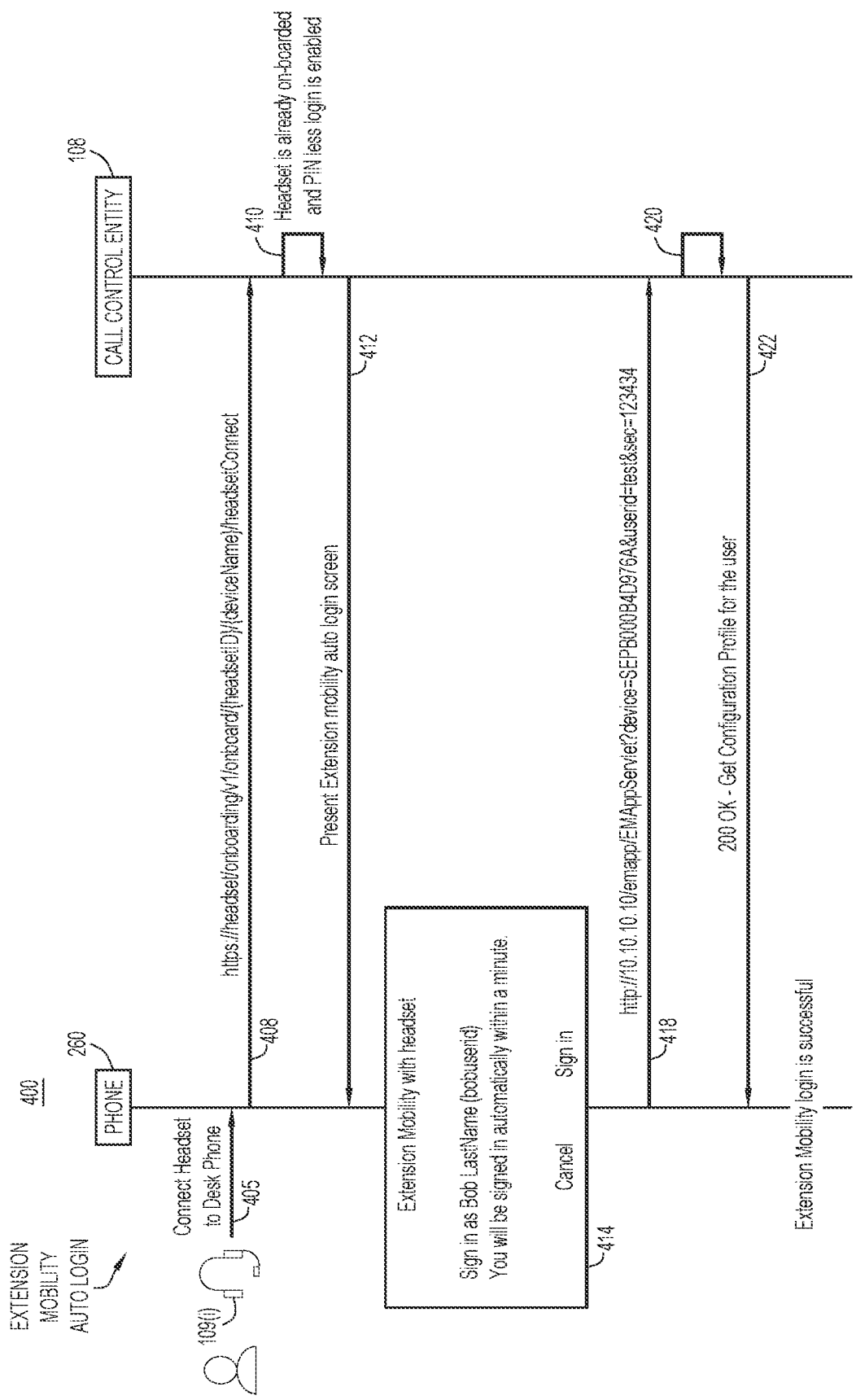
FIG. 4A is a transaction diagram of detailed transactions for extension mobility auto login using a headset, performed after the headset has been onboarded, according to an example embodiment.

With reference to FIG. 4A, there is a transaction diagram of detailed example transactions 400 for extension mobility auto login using headset 109(*i*) through phone 260 after the headset has been onboarded with call control entity 108. Transactions 400 expand on extension mobility auto login 250B described above in connection with FIG. 2B.

At 405, the user connects headset 109(*i*) to phone 260. The connection enables bi-directional communication between headset 109(*i*) and phone 260. Sensing the connection, at 405, phone 260 retrieves from headset 109(*i*) information, including the headset identifier and the device name of the headset. At 408, phone 260 sends to call control entity 108 a headset connect message, which may include a request to initiate headset onboarding, as described above. The headset connect message includes the headset identifier, the headset device name, an indicator that the headset is connected to a phone, a device identifier of phone 260, and optionally an indication that the request is to initiate headset onboarding. In an example, the headset connect message may be in the form of a HyperText Transfer Protocol (HTTP) request that includes a URL to a service hosted on call control entity 108. Call control entity 108 receives the request.

Responsive to the headset connect message, at 410, call control entity 108 determines whether headset 109(*i*) has already been onboarded, e.g., whether the headset identifier has already been mapped to a user identifier (which may in-turn be mapped to or indicate an IP phone configuration profile in call control database 110). To do this, call control entity 108 searches call control database 110 for an existing headset mapping between the headset identifier and a user identifier. If there is no existing headset mapping because headset 109(*i*) has not yet been onboarded, flow terminates or, alternatively, the flow may be directed to the headset onboarding process described above.

On the other hand, if the mapping does exist because headset 109(*i*) has been onboarded, at 412, call control entity 108 sends to phone 260 an extension mobility auto login UI to be displayed on a screen of the phone. The UI includes a prompt to enter a user identifier assigned to a user and, optionally, a prompt to enter a user PIN associated with the user identifier. When PIN-less login is enabled at call control entity 108, the UI omits the prompt for the user PIN.

At 414, phone 260 receives the UI and presents the UI. Upon entry of the user identifier at phone 260, at 418, the phone forwards to call control entity 108 a message including the user identifier.

At 420, upon receiving the message including the user identifier, call control entity 108 searches call control database 110 for the headset mapping between the user identifier and the headset, and by which the IP phone configuration profile assigned to the user associated with the user identifier is accessible. When call control entity 108 finds the headset mapping, the call control entity access the IP phone configuration profile and, at 422, sends the profile to phone 260, along with a status message indicating extension mobility auto login success (e.g., an HTTP 200—OK).

Figure 4B:
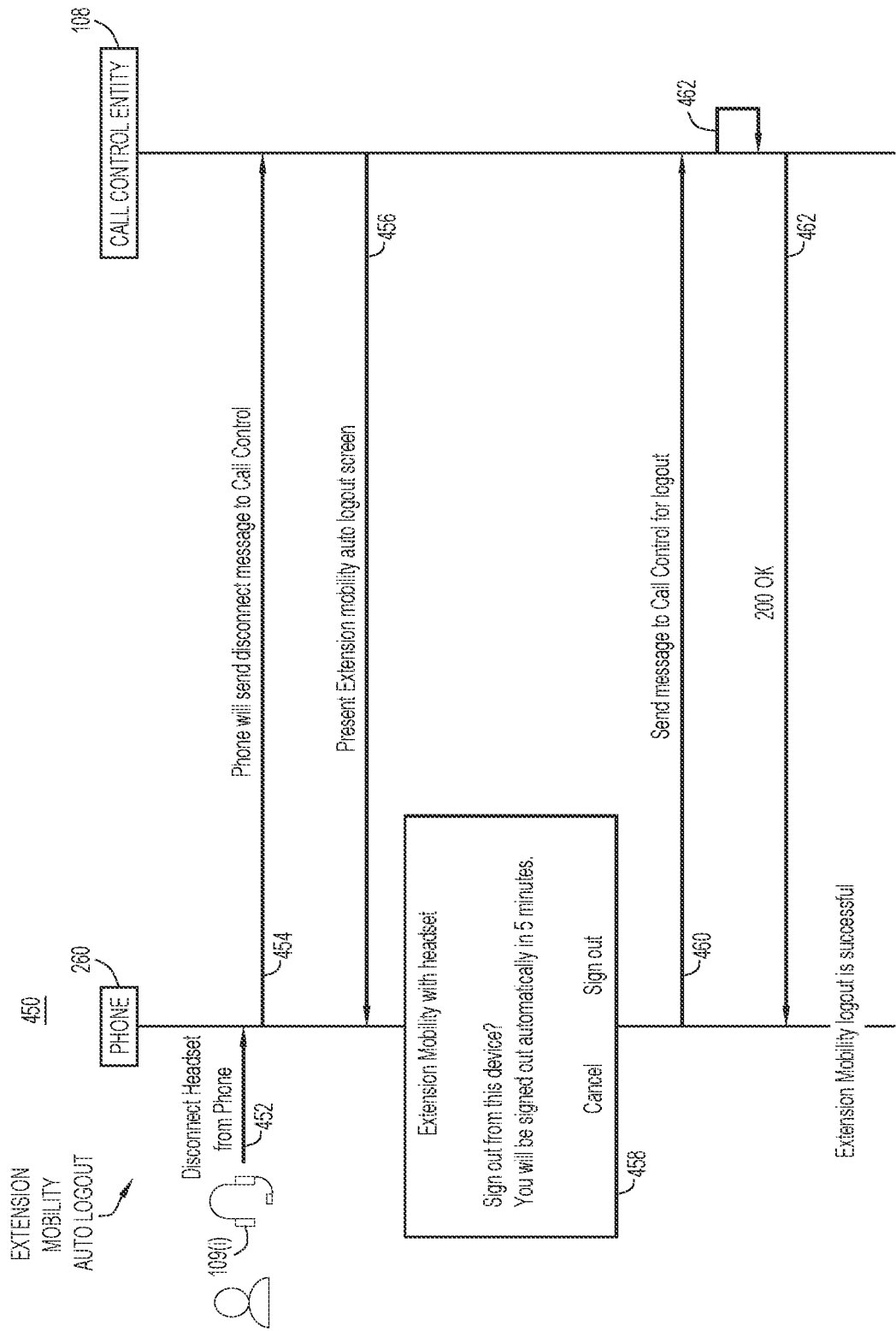
FIG. 4B is a transaction diagram of detailed transactions for extension mobility auto logout using a headset, performed after extension mobility auto login with the headset, according to an example embodiment.

With reference to FIG. 4B, there is a transaction diagram of detailed example transactions 450 for an extension mobility auto logout of the user from call control entity 108 responsive to disconnection of headset 109(*i*) from phone 260, performed after completing the extension mobility auto login.

At 452, the user disconnects headset 109(i) from phone 260. Responsive to headset 109(i) being disconnected, at 454, phone 260 sends to call control entity 108 a headset disconnect message indicating that the headset has been disconnected. Responsive to the headset disconnect message, at 456, call control entity 108 sends to IP phone 260 an extension mobility auto logout UI for display at the phone. The UI prompts the user to enter confirmation of logout intent. At 458, phone 260 displays the UI and receives entry of the confirmation by the user. Responsive to entry of the confirmation (e.g., entry of a command confirming extension motility logout), at 460, phone 260 sends to call control entity 108 a message confirming logout. Upon receiving the message confirming logout, at 462, call control entity 108 performs logout of the user, and sends to phone 260 a success message indicating success of the user logout.

Figure 5A:
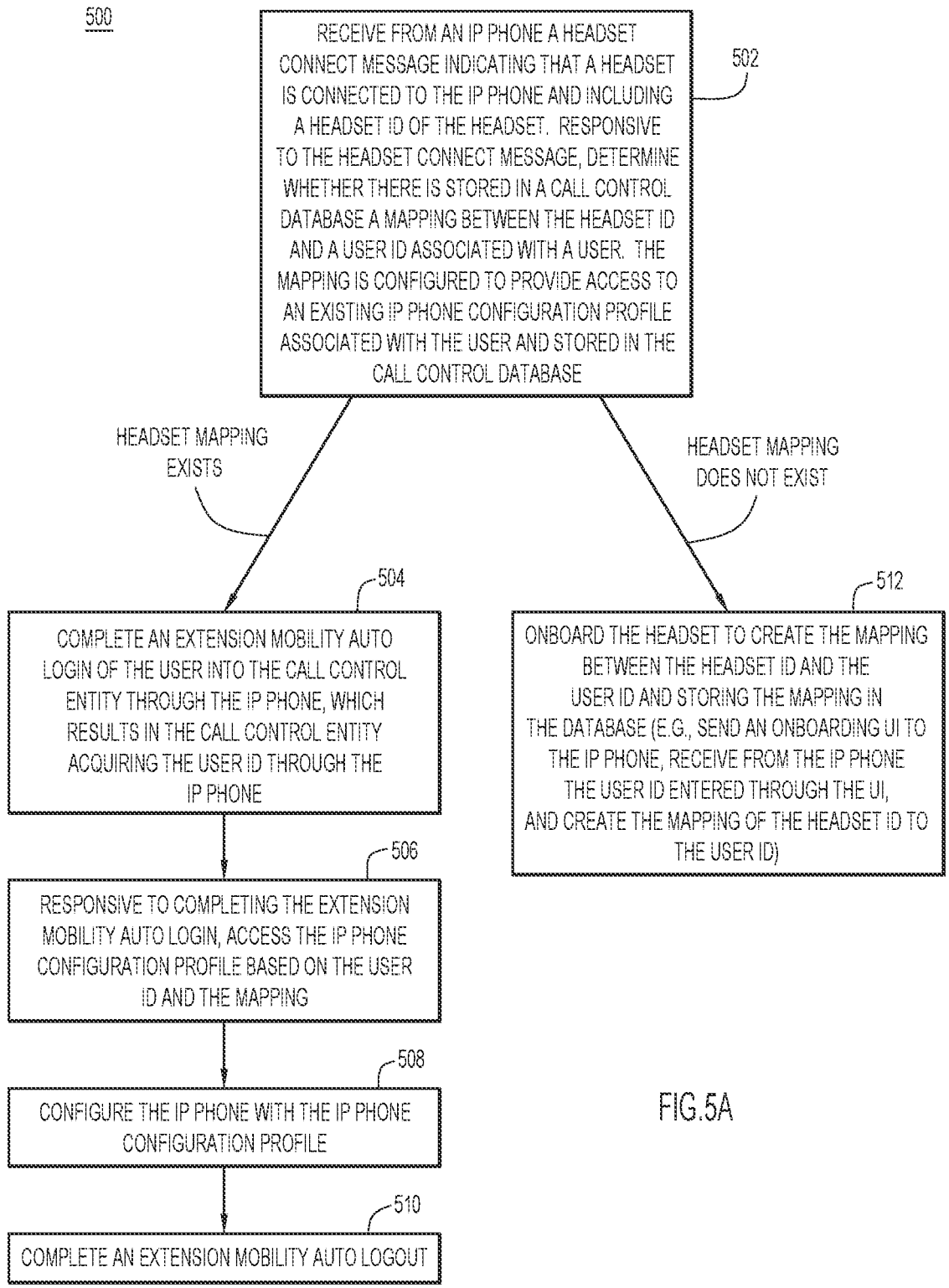
FIG. 5A is a flowchart of a method of performing headset onboarding, extension mobility auto login, and extension mobility auto logout using a headset, according to an example embodiment.

FIG. 5A is a flowchart of a method 500 of performing headset onboarding, extension mobility auto login, and extension mobility auto logout through an IP phone using a headset, according to an example embodiment. Method 500 is performed primarily by call control entity 108.

At 502, call control entity 108 receives from an IP phone a headset connect message indicating that a headset is connected to the IP phone. The headset connect message includes a headset identifier of the headset and a device identifier of the IP phone. Upon receiving the headset connect message, call control entity 108 determines whether there is stored in call control database 110 a headset mapping between the headset identifier and a user identifier assigned to/associated with a user, i.e., whether the headset mapping exists due to a previous onboarding of the headset. The headset mapping is configured to provide access to an existing IP phone configuration profile stored in call control database 110. If the mapping exists, flow proceeds to 504. If the headset mapping does not exist, flow proceeds to 512.

At 504, call control entity 108 exchanges messages with the IP phone to complete an extension mobility auto login of the user into the call control entity, through the IP phone. The extension mobility auto login results in call control entity 108 acquiring the user identifier through the IP phone. For example, call control entity sends to the IP phone an extension mobility user interface to be displayed by the IP phone and that requests entry of the user identifier, and then receives from the IP phone the user identifier as entered at the IP phone.

Responsive to completing the extension mobility auto login, at 506, call control entity 108 access the IP phone configuration profile based on the user identifier and the headset mapping. At 508, call control entity 108 sends the IP phone configuration profile to the IP phone, in order to configure the IP phone with the profile.

At 510, call control entity 108 completes extension mobility auto logout of the user from the call control entity.

If the headset was not previously onboarded, i.e., the headset mapping does not exist, at 512, call control entity 108 performs headset onboarding of the headset (i.e., "onboards" the headset) to create the headset mapping between the headset identifier and the user identifier, and stores the mapping in call control database 110 for access pursuant to a subsequent extension mobility auto login. To perform the headset onboarding, call control entity 108 (i) sends to the IP phone an onboarding UI to for display at the IP phone and that prompts the entry of the user identifier, (ii) receives from the IP phone the user identifier as entered, (iii) creates the mapping between the headset identifier and the user identifier, and (iv) links the mapping to an IP phone configuration profile for the user.

FIG. 5B is a flowchart of a method 550 of performing headset onboarding and extension mobility auto login through first and second IP phones, respectively, using a headset, according to an example embodiment. Method 550 is performed primarily by call control entity 108.

At 552, upon receiving from a first IP phone a first headset connect message indicating that a headset is connected to the first IP phone and including a headset identifier of the headset, call control entity 108 (i) determines that a mapping between a user identifier assigned to a user and the headset identifier does not exist in call control database 110 (i.e., searches the database and does not find the mapping), and (ii) responsive to the determining that the mapping does not exist, onboards the headset by acquiring the user identifier from the first IP phone, and creating the mapping (between the user identifier and the headset identifier) by which an existing IP phone configuration profile is accessible.

At 554, upon receiving from a second IP phone a second connect message indicating that the headset is connected to the second IP phone and including the headset identifier of the headset, call control entity 108 (i) determines that the mapping between the user identifier and the headset identifier exists in call control database 110 (i.e., searches the database and finds the mapping), (ii) completes an extension mobility auto login of the user through the second IP phone, which results in acquiring the user identifier from the second IP phone, (iii) responsive to the completing the extension mobility auto login, accesses the existing IP phone configuration profile based on the user identifier from the extension mobility auto login and the mapping, and (iv) configures the second IP phone with the existing IP phone configuration profile.

Figure 6:
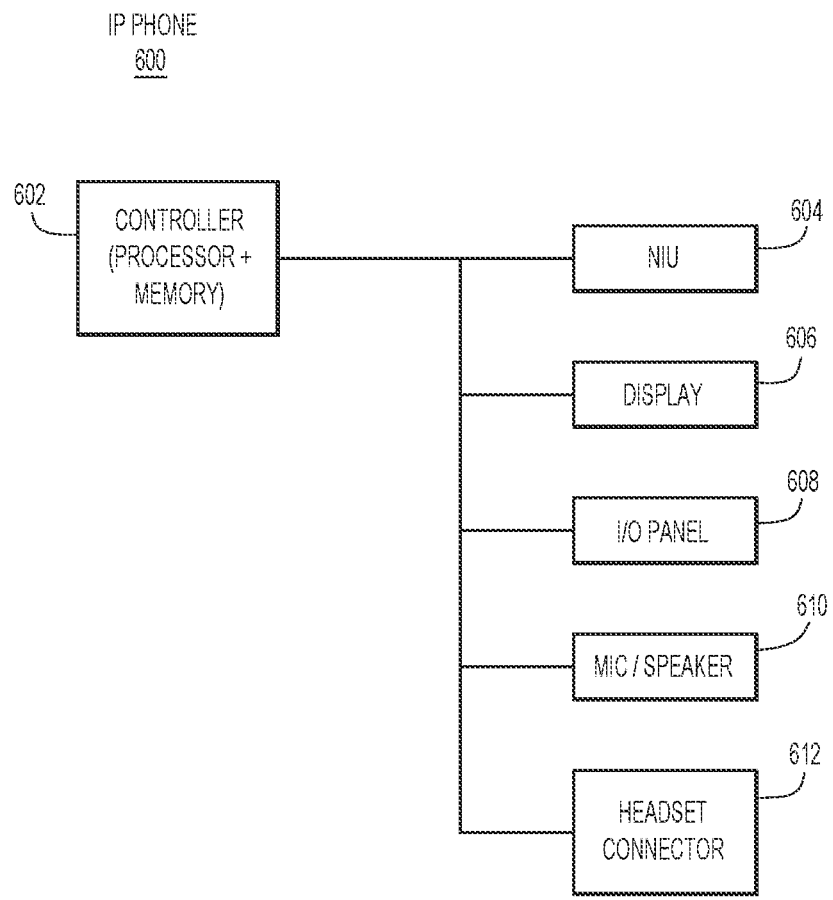
FIG. 6 is a high-level block diagram of an IP phone, according to an example embodiment.

With reference to FIG. 6, there is a high-level block diagram of an example IP phone 600 representative of any of IP phones 102, e.g., IP phones 252 and 260. IP phone 600 includes the following components that are electrically and communicatively coupled with each other: a controller 602, having a processor and memory, for controlling the IP phone; a network interface unit (NIU) 604, which may include, e.g., an Ethernet card, to provide wired or wireless communications with a network, e.g., to send/receive data packets to/from the network; a display 606 for displaying information; an input/output (I/O) panel 608, such as a keypad, for entering information into the IP phone; microphone (MIC)/loudspeaker (SPKR) circuits 610, and an audio/signal connector 612 for a headset connection. The processor of controller 602 executes instructions of control logic stored in the associated memory to perform operations associated with headset onboarding and extension mobility auto login, as described above.

Figure 7:
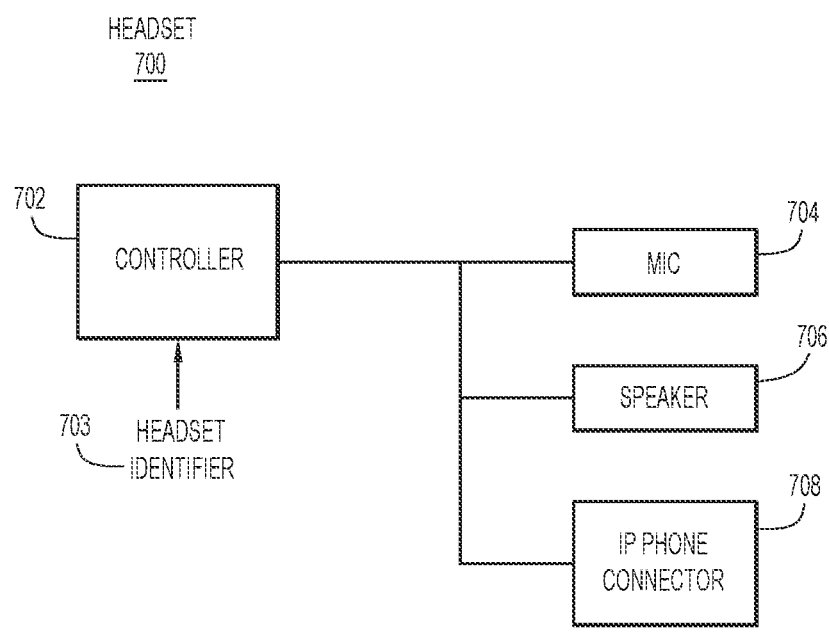
FIG. 7 is high-level block diagram of a headset for use with the IP phone, according to an example embodiment.

With reference to FIG. 7, there is a high-level block diagram of an example headset 700 representative of any of headsets 109. Headset 700 includes the following components that are electrically and communicatively connected to each other: a controller 702 including memory to store a headset identifier 703; a microphone 704, speakers 706, and an audio/signal connector 708 for connecting with a headset connector of an IP phone.

Figure 8:
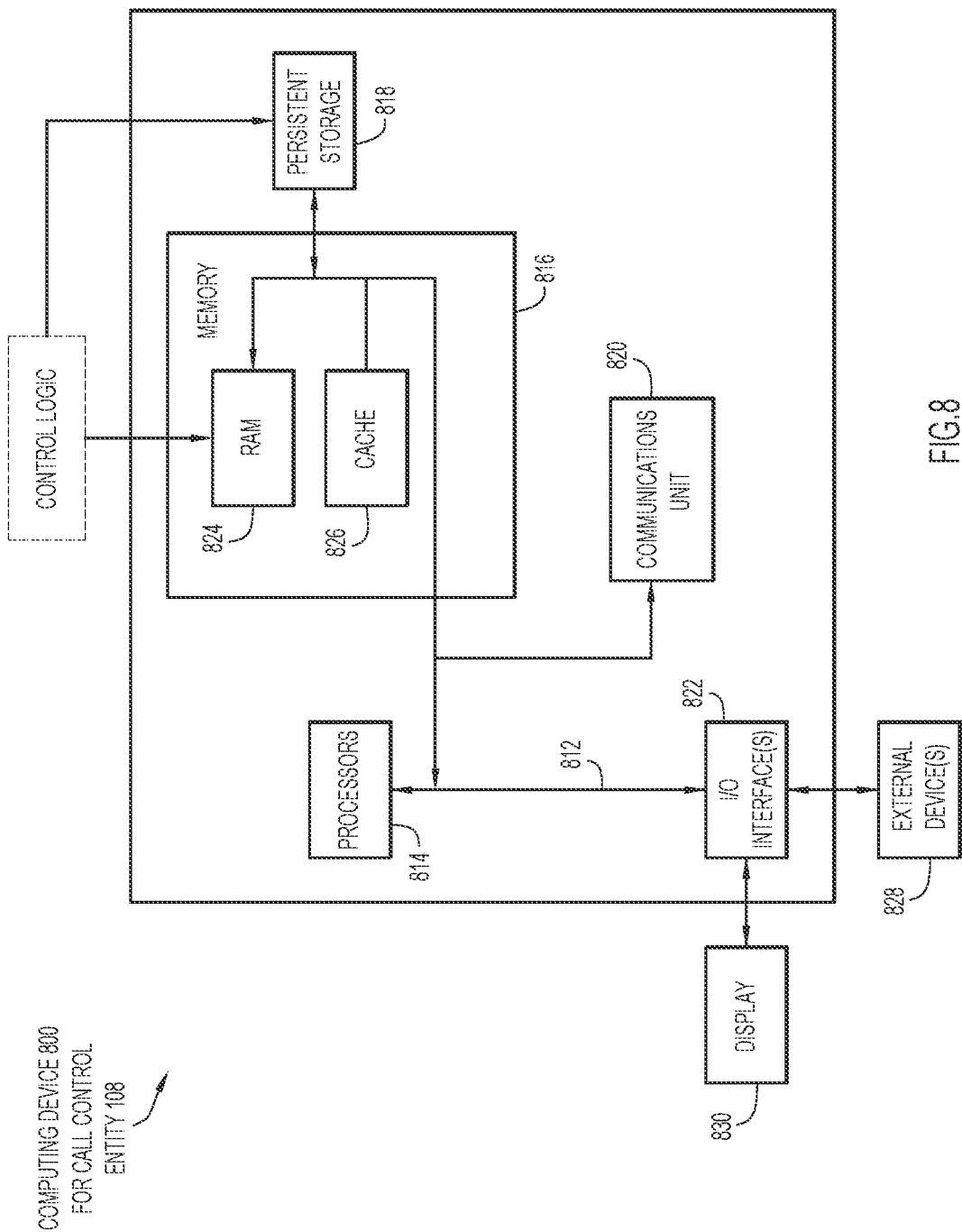
FIG. 8 is an illustration of a hardware block diagram of a computing device that may perform the functions of the call control entity, according to an example embodiment.

FIG. 8 illustrates a hardware block diagram of a computing device 800 that may perform the functions of any of the servers or computing or control entities referred to herein in connection with call control entity 108. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the Control Logic may be stored in memory 816 or persistent storage 818 for execution by processor(s) 814. Execution of the Control Logic causes the processors to implement/perform the operations and methods of the various embodiments described herein, for example, operations associated with transactions 300 and 400 and methods 250, 500, and 550 for example.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards (e.g., an NIU). Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one aspect, a method is provided comprising: at a call control entity configured to communicate with Internet Protocol (IP) phones: upon receiving from an IP phone a headset connect message indicating that a headset is connected to the IP phone and including a headset identifier of the headset, determining whether there is stored in a call control database a mapping between the headset identifier and a user identifier associated with a user, the mapping configured to provide access to an existing IP phone configuration profile in the call control database; if the mapping exist, completing an extension mobility auto login of the user through the IP phone, which results in acquiring the user identifier from the IP phone; responsive to the completing the extension mobility auto login, accessing the existing IP phone configuration profile based on the user identifier and the mapping; and configuring the IP phone with the existing IP phone configuration profile.

In another aspect, an apparatus is provided comprising: a network interface unit configured to communicate with Internet Protocol (IP) phones over a network; and a processor coupled to the network interface unit and configured to perform: upon receiving from an IP phone a headset connect message indicating that a headset is connected to the IP phone and including a headset identifier of the headset, determining whether there is stored in a call control database a mapping between the headset identifier and a user identifier associated with a user, the mapping configured to provide access to an existing IP phone configuration profile in the call control database; if the mapping exist, completing an extension mobility auto login of the user through the IP phone, which results in acquiring the user identifier from the IP phone; responsive to the completing the extension mobility auto login, accessing the existing IP phone configuration profile based on the user identifier and the mapping; and configuring the IP phone with the existing IP phone configuration profile.

In yet another aspect, a computer readable medium is provided. The computer readable medium is encoded with instructions that, when executed by a processor, cause the processor to, at a call control entity configured to communicate with Internet Protocol (IP) phones: upon receiving from an IP phone a headset connect message indicating that a headset is connected to the IP phone and including a headset identifier of the headset, determining whether there is stored in a call control database a mapping between the headset identifier and a user identifier associated with a user, the mapping configured to provide access to an existing IP phone configuration profile in the call control database; if the mapping exist, completing an extension mobility auto login of the user through the IP phone, which results in acquiring the user identifier from the IP phone; responsive to the completing the extension mobility auto login, accessing the existing IP phone configuration profile based on the user identifier and the mapping; and configuring the IP phone with the existing IP phone configuration profile.

In a further aspect, a method is provided comprising: at a call control entity configured to communicate with Internet Protocol (IP) phones: upon receiving from a first IP phone a first headset connect message indicating that a headset is connected to the first IP phone and including a headset identifier of the headset, onboarding the headset by acquiring a user identifier assigned to a user from the first IP phone, and creating a mapping between the user identifier and the headset identifier and by which an existing IP phone configuration profile is accessible; upon receiving from a second IP phone a second headset connect message indicating that the headset is connected to the second IP phone and including the headset identifier of the headset, completing an extension mobility auto login of the user through the second IP phone, which results in acquiring the user identifier from the second IP phone; responsive to the completing the extension mobility auto login, accessing the existing IP phone configuration profile based on the user identifier and the mapping; and configuring the IP phone with the existing IP phone configuration profile.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a call control entity including a call control database and configured to communicate with Internet Protocol (IP) phones:
storing, in the call control database, IP phone configuration profiles and mappings that link headset identifiers, user identifiers associated with users, and the IP phone configuration profiles to each other for corresponding ones of the IP phones, and that serve as indexes for accessing corresponding ones of the IP phone configuration profiles;
upon receiving from an IP phone a headset connect message indicating that a headset is connected to the IP phone and including a headset identifier of the headset and a device identifier of the IP phone, determining whether there is a mapping among the mappings that links the headset identifier, a user identifier associated with a user, and an existing IP phone configuration profile to each other for the IP phone;
if the mapping exists, completing an extension mobility auto login of the user through the IP phone, which results in acquiring the user identifier from the IP phone;
responsive to completing the extension mobility auto login, using the mapping as an index for accessing the existing IP phone configuration profile in the call control database;
configuring the IP phone with the existing IP phone configuration profile; and
if the mapping does not exist, onboarding the headset by:
searching the call control database for the user identifier in association with the device identifier and, if found, sending to the IP phone an onboarding user interface to be displayed by the IP phone, wherein the onboarding user interface includes a first prompt for a user identifier prepopulated with the user identifier and a second prompt for entry of a Personal Identification Number (PIN); and
upon receiving the PIN as entered at the IP phone, creating the mapping, and storing the mapping in the call control database.

2. The method of claim 1, wherein:
the headset connect message includes a HyperText Transfer Protocol (HTTP) request that includes a uniform resource locator (URL) to a headset onboarding service hosted on the call control entity.

3. The method of claim 1, further comprising, at the IP phone:
responsive to receiving the onboarding user interface from the call control entity, sending to the call control entity a request to complete onboarding.

4. The method of claim 1, wherein completing the extension mobility auto login of the user includes:
sending to the IP phone an extension mobility auto login user interface to be displayed by the IP phone and that requests entry of the user identifier; and
receiving from the IP phone the user identifier as entered at the IP phone.

5. The method of claim 4, wherein:
the extension mobility auto login user interface further requests entry of a PIN for the user;
receiving from the IP phone further includes receiving the PIN; and
the method further comprises conditioning access to the existing IP phone configuration profile using the PIN.

6. The method of claim 4, further comprising completing an extension mobility auto logout of the user, including:
sending to the IP phone an extension mobility auto logout user interface to be displayed by the IP phone and that requests entry of a command confirming extension mobility auto logout; and
upon receiving the command as entered, sending to the IP phone a user interface confirming the extension mobility auto logout.

7. The method of claim 1, wherein the configuring the IP phone includes sending to the IP phone the existing IP phone configuration profile.

8. The method of claim 1, wherein the existing IP phone configuration profile includes one or more of an IP phone button template, an IP phone soft-key template, an extension number, a dial plan, and speed dials.

9. An apparatus comprising:
a network interface unit configured to communicate with Internet Protocol (IP) phones over a network;
a call control database configured to store IP phone configuration profiles, and mappings that link headset identifiers, user identifiers associated with users, and the IP phone configuration profiles to each other for corresponding ones of the IP phones, and that serve as indexes for accessing corresponding ones of the IP phone configuration profiles; and
a processor coupled to the network interface unit and the call control database and configured to:
upon receiving from an IP phone a headset connect message indicating that a headset is connected to the IP phone and including a headset identifier of the headset and a device identifier of the IP phone, determining whether there is a mapping among the mappings that links the headset identifier, a user identifier associated with a user, and an existing IP phone configuration profile to each other for the IP phone;
if the mapping exists, completing an extension mobility auto login of the user through the IP phone, which results in acquiring the user identifier from the IP phone;
responsive to completing the extension mobility auto login, using the mapping as an index for accessing the existing IP phone configuration profile in the call control database;
configuring the IP phone with the existing IP phone configuration profile; and
if the mapping does not exist, onboarding the headset by:
searching the call control database for the user identifier in association with the device identifier and, if found, sending to the IP phone an onboarding user interface to be displayed by the IP phone, wherein the onboarding user interface includes a first prompt for a user identifier prepopulated with the user identifier and a second prompt for entry of a Personal Identification Number (PIN); and
upon receiving the PIN as entered at the IP phone, creating the mapping, and storing the mapping in the call control database.

10. The apparatus of claim 9, wherein
the headset connect message includes a HyperText Transfer Protocol (HTTP) request that includes a uniform resource locator (URL) to a headset onboarding service.

11. The apparatus of claim 9, wherein the processor is further configured to perform onboarding the headset by:
receiving, from the IP phone, a request to complete onboarding.

12. The apparatus of claim 9, wherein the processor is configured to perform completing the extension mobility auto login of the user by:
sending to the IP phone an extension mobility auto login user interface to be displayed by the IP phone and that requests entry of the user identifier; and
receiving from the IP phone the user identifier as entered at the IP phone.

13. The apparatus of claim 12, wherein:
the extension mobility auto login user interface further requests entry of a PIN for the user;
the processor is configured to perform receiving from the IP phone by receiving the PIN; and
the processor is further configured to perform conditioning access to the existing IP phone configuration profile using the PIN.

14. The apparatus of claim 12, wherein the processor is further configured to perform completing an extension mobility auto logout of the user, including:
sending to the IP phone an extension mobility auto logout user interface to be displayed by the IP phone and that requests entry of a command confirming extension mobility auto logout; and
upon receiving the command as entered, sending to the IP phone a user interface confirming the extension mobility auto logout.

15. The apparatus of claim 9, wherein the processor is configured to perform configuring the IP phone by sending to the IP phone the existing IP phone configuration profile.

16. The apparatus of claim 9, wherein the existing IP phone configuration profile includes one or more of an IP phone button template, an IP phone soft-key template, an extension number, a dial plan, and speed dials.

17. A non-transitory computer readable medium encoded with instructions that, when executed by a processor of a call control entity including a call control database for storing Internet Protocol (IP) phone configuration profiles for IP phones, and mappings that link headset identifiers, user identifiers associated with users, and the IP phone configuration profiles to each other for corresponding ones of the IP phones, and that serve as indexes for accessing corresponding ones of the IP phone configuration profiles, cause the processor to perform:
upon receiving from an IP phone a headset connect message indicating that a headset is connected to the IP phone and including a headset identifier of the headset and a device identifier of the IP phone, determining whether there is a mapping among the mappings that links the headset identifier, a user identifier associated with a user, and an existing IP phone configuration profile to each other for the IP phone;
if the mapping exists, completing an extension mobility auto login of the user through the IP phone, which results in acquiring the user identifier from the IP phone;
responsive to completing the extension mobility auto login, using the mapping as an index for accessing the existing IP phone configuration profile in the call control database;
configuring the IP phone with the existing IP phone configuration profile; and
if the mapping does not exist, onboarding the headset by:
searching the call control database for the user identifier in association with the device identifier and, if found, sending to the IP phone an onboarding user interface to be displayed by the IP phone, wherein the onboarding user interface includes a first prompt for a user identifier prepopulated with the user identifier and a second prompt for entry of a Personal Identification Number (PIN); and
upon receiving the PIN as entered at the IP phone, creating the mapping, and storing the mapping in the call control database.

18. The non-transitory computer readable medium of claim 17, wherein:
the headset connect message includes a HyperText Transfer Protocol (HTTP) request that includes a uniform resource locator (URL) to a headset onboarding service hosted on the call control entity.

19. The non-transitory computer readable medium of claim 17, wherein the existing IP phone configuration profile includes one or more of an IP phone button template, an IP phone soft-key template, an extension number, a dial plan, and speed dials.

20. The non-transitory computer readable medium of claim 17, wherein completing the extension mobility auto login of the user includes:
sending to the IP phone an extension mobility auto login user interface to be displayed by the IP phone and that requests entry of the user identifier; and
receiving from the IP phone the user identifier as entered at the IP phone.

* * * * *